United States Patent
Negishi et al.

(10) Patent No.: US 6,817,788 B1
(45) Date of Patent: Nov. 16, 2004

(54) DIAPHRAGM DEVICE

(75) Inventors: Shigeto Negishi, Komochi-mura (JP); Shigeki Saitoh, Komochi-mura (JP); Takashi Tomaru, Komochi-mura (JP)

(73) Assignee: Nihon Seimitsu Sokki Co., Ltd., Gunma (JP)

( * ) Notice: Subject to any disclaimer, the term of this patent is extended or adjusted under 35 U.S.C. 154(b) by 0 days.

(21) Appl. No.: 10/705,746

(22) Filed: Nov. 12, 2003

(30) Foreign Application Priority Data

May 29, 2003 (JP) .................................. PCT/JP03/06753

(51) Int. Cl.$^7$ ................................................. G03B 9/02
(52) U.S. Cl. ...................... 396/505; 348/342; 348/360; 348/361
(58) Field of Search ................................ 396/241, 225, 396/505; 348/342, 360–366

(56) References Cited

U.S. PATENT DOCUMENTS

| | | | | |
|---|---|---|---|---|
| 4,040,067 | A | * 8/1977 | Kondo | ........................ 396/241 |
| 6,533,473 | B1 | * 3/2003 | Edamitsu et al. | ........... 396/450 |
| 2002/0003583 | A1 | 1/2002 | Arai | |
| 2002/0044212 | A1 | 4/2002 | Hashimoto | |
| 2004/0130653 | A1 | * 7/2004 | Nanjo et al. | ................. 348/363 |

FOREIGN PATENT DOCUMENTS

| JP | 02-067530 | 3/1990 |
|---|---|---|
| JP | 10-133254 | 5/1998 |
| JP | 10-254022 | 9/1998 |
| JP | 11-109440 | 4/1999 |
| JP | 11-149104 | 6/1999 |
| JP | 2000-106649 | 4/2000 |
| JP | 2003-005005 | 1/2003 |

* cited by examiner

Primary Examiner—W. B. Perkey
(74) Attorney, Agent, or Firm—Venable LLP; Catherine M. Voorhees (57) ABSTRACT

To aim at achieving reduction in size and weight of a diaphragm device provided with an optical filter insertable into and retractable from a light path, so that the diaphragm device can be easily installed into a lens tube of a CCTV camera.

The diaphragm device comprises a diaphragm board 10 having an aperture 10a forming a light path, a pair of diaphragm blades 12 and 13 disposed on one face of the diaphragm board and adjusting the aperture of the diaphragm for the light path by sliding along the board face, a diaphragm driving device 20 driving the diaphragm blades 12 and 13 to adjust the aperture of the diaphragm for the light path, an optical filter (infrared cutoff filter) 15 having transmission characteristics in accordance with a wave length, and a filter driving device 30 to insert the optical filter into and retract it from the light path. The optical filter is formed in a thin film, and disposed between two sheets of the diaphragm blades 12 and 13 to make the optical filter slidable along the diaphragm blades. The optical filter 15 is pivotably supported by a spindle 10c and the diaphragm driving device 20 and the filter driving device 30 are disposed together on the same side of the light path.

20 Claims, 4 Drawing Sheets

DIAPHRAGM DEVICE

CROSS REFERENCE TO THE APPLICATION

This application is related to and claims proirty of PCT/JP03/06753, filed May 29, 2003.

TECHNICAL FIELD

The present invention relates to an optical diaphragm device in which an optical filter such as an infrared cutoff filter or the like is installed insertably into and retractably from a light path, and in particular, relates to a diaphragm device to be assembled to a photographic device such as a CCTV (monitor camera system) lens or the like.

BACKGROUND ART

A day and night monitor camera system which by day takes color photographs by focusing light in visible light region and at night takes monochrome photographs by focusing light in near-infrared light region in addition to that in the visible light region on an image picking device (CCD, CMOS or the like) of a camera body so that an monitored image is projected on a TV monitor has been known (for instance, refer to Patent Document 1).

In the daytime, this system photographs in color using light in the visible light region alone by placing an infrared cutoff filter in front of an image pickup device (inside a camera body or a lens tube), and photographs in monochrome using light in both the infrared and visible light regions by withdrawing the filter from the front of the image pickup device at night.

FIGS. 4(a) and 4(b) are views showing the structure of a conventional CCTV camera which provides an infrared cutoff filter inside its camera body.

The CCTV camera comprises a camera body 100A and a lens tube 200A fixed in front thereof An image pickup device 130 and an infrared cutoff filter 110 are provided inside the camera body 100A. In addition, a diaphragm 210 is provided inside the lens tube 200A.

The infrared cutoff filter 110 in the camera body 100A is driven by a filter driving actuator 230 provided in the camera body 100A such as a motor or the like so that the filter 110 is inserted into and retracted from a light path L in front of the image pickup device 130. FIG. 4(a) shows a state that the infrared cutoff filter 110 is inserted into the light path L, and FIG. 4(b) shows a state that the infrared cutoff filter 110 is retracted from the light path L. Meanwhile, the diaphragm 210 in the lens tube 200A is driven by a diaphragm-driving actuator 220 provided in the lens tube 200A such as a galvanometer or the like to adjust the diameter of its diaphragm aperture.

In FIG. 4(a), since the infrared cutoff filter 110 is inserted into the light path L, light incident into the lens tube 200A enters into the camera body 100A through the diaphragm 210, passes through the infrared cutoff filter 110, and reaches the image pickup device 130 to be projected as a subject image. On the other hand, in FIG. 4(b), since the infrared cutoff filter 110 is retracted from the light path L, light incident into the lens tube 200A enters into the camera body 100A via the diaphragm 210, and directly reaches the image pickup device 130 without passing through the infrared cutoff filter 110 to be projected as a subject image.

FIGS. 5(a) and (b) are views showing the structure of another conventional CCTV camera which provides an infrared cutoff filter inside a lens tube.

The CCTV camera comprises a camera body 100B and a lens tube 200B fixed in the front thereof. Unlike the conventional example shown in FIG. 4, an infrared cutoff filter 110 and a filter-driving actuator 230 are provided inside a lens tube 200B, not inside a camera body 100B. The image pickup device 130 and the diaphragm 210 are the same as in the example shown in FIG. 4.

In addition, in this CCTV camera, a dummy filter 111 is provided adjacent to the infrared cutoff filter 110. The dummy filter 111 comprises a translucent parallel plane panel having nearly the same thickness as that of the infrared cutoff filter 110 and serves to prevent light from being incorrectly focused to the image pickup device 130 due to any difference in the length of the light path, occurring when the infrared cutoff filter 110 is placed in the light path and away from the light path, by compensating for such difference.

Consequently, the infrared cutoff filter 110 and the dummy filter 111 are installed on the same holder (not shown) so that either the infrared cutoff filter 110 or the dummy filter 111 can be placed in the light path L by driving the holder with the filter-driving actuator 230.

Since the conventional infrared cutoff filter is relatively thick (0.5 mm or more in thickness), in a CCTV camera described in Patent Document 1, a diaphragm device in which an infrared cutoff filter is provided integrally is structured while avoiding the complication of diaphragm structure by disposing the infrared cutoff filter on one surface side of a diaphragm board (not shown) when a diaphragm blade is disposed on the other surface side of the diaphragm board.

Patent Document 1: Japanese Patent Laid-open 2002-189238

Figure 4:
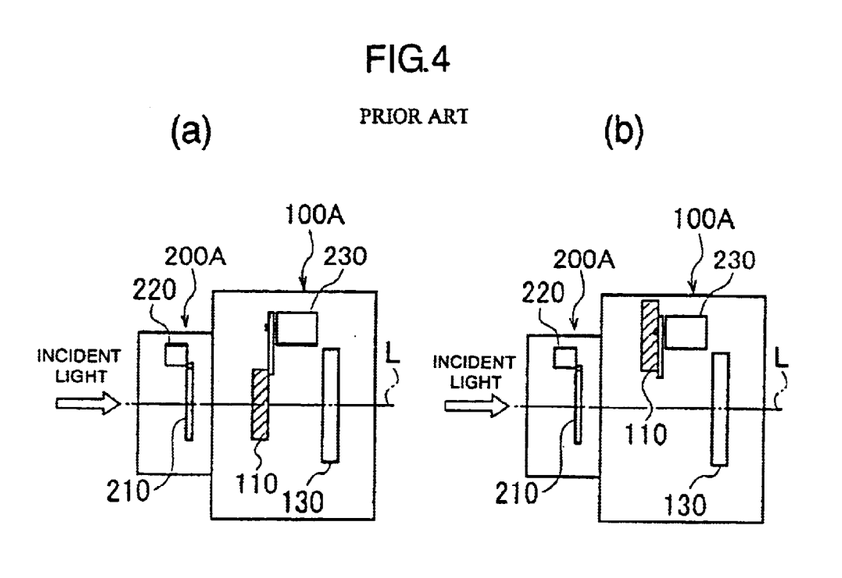
FIG. 4 is a schematic block diagram showing relation between a diaphragm and an optical filter in a conventional CCTV camera system, wherein (a) is a view showing a state that the optical filter is positioned in the light path, and (b) is a view showing a state that the optical filter is taken out from the light path.

In the conventional CCTV camera shown in FIG. 4, the infrared cutoff filter 110 is disposed inside the camera body 100A. However, since the camera body 100A has become smaller in recent CCTV cameras, it has become difficult to provide the infrared cutoff filter 110 and its driving mechanism (actuator 230) inside the camera body 100A itself.

Figure 5:
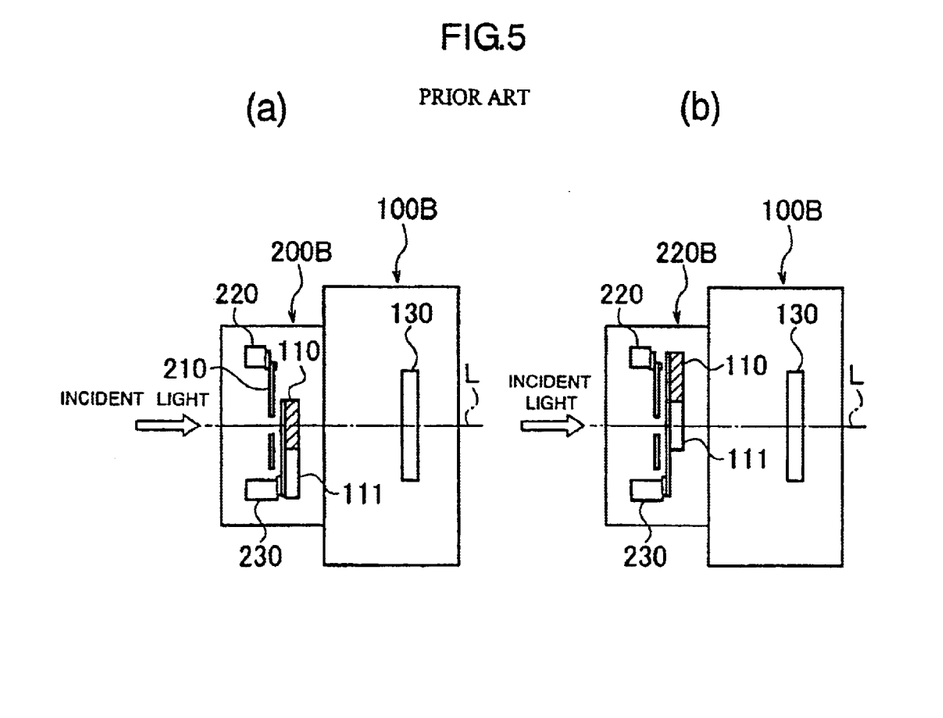
FIG. 5 is a schematic block diagram showing relation between a diaphragm and an optical filter in another conventional CCTV camera system, wherein (a) is a view showing a state that the optical filter is positioned in the light path, and (b) is a view showing a state that the optical filter is taken out from the light path.

Consequently, provision of the diaphragm 230 together with the infrared cutoff filter 110 in the lens tube 200B as shown in FIG. 5 becomes a promising structure. Especially, as described in Patent Document 1, installation of an infrared cutoff filter and its driving mechanism integrally on a diaphragm device has become common.

However, since a relatively thick infrared cutoff filter is used in a diaphragm device with a conventional infrared cutoff filter installed integrally as is described in Patent Document 1, the infrared cutoff filter and diaphragm blades must be disposed on the top and bottom faces of a diaphragm board respectively when considering the workability of the diaphragm blade and the infrared cutoff filter. This limits the downsizing of the diaphragm device. Further, to compensate for focusing, a dummy filter, in addition to the infrared cutoff filter, needs to be used in order to mrake the length of the light path equal. This also makes it difficult to downsize the diaphragm. Moreover, since the dummy filter is used in addition to the thick infrared cutoff filter, the weight of the filter must also be increased, which leads to a larger filter driving system. Consequently, it becomes difficult to meet the demand of reduction in size and weight of the lens tube.

Considering the above-described situation, an object of the present invention is to provide a diaphragm device which integrally provides an optical filter that can be inserted into and retracted from a light path, and is possible to reduce in size and weight so that it can be simply fixed to a lens tube of, for instance, a CCTV camera.

DISCLOSURE OF THE INVENTION

A diaphragm device of a first invention comprises: a diaphragm board having an aperture forming a light path; a diaphragm blade disposed on one face of the diaphragm board, and adjusting the aperture of the diaphragm for the light path by sliding along the board face; a diaphragm driving device driving the diaphragm blade to adjust the aperture of the diaphragm for the light path; an optical filter having transmission characteristics in accordance with a wave length; and a filter driving device to insert the optical filter into and retract it from the light path, wherein the above-described optical filter is formed in a thin film, disposed on one face side of the diaphragm board, and provided slidably along the diaphragm blades.

In the diaphragm device of the present invention, since the optical filter is formed in a thin film, disposed together with the diaphragm blades on one face of the diaphragm board, and provided slidably along the diaphragm blades, the structure can be simpler than that of the conventional example in which the diaphragm blades and the optical filter are disposed on both the front and bottom faces of the diaphragm board respectively. Further, since the optical filter is formed in a thin film, the optical filter can be disposed in a narrow space such as a gap between the diaphragm blades, a gap between the diaphragm blades and the diaphragm board, or the like. Furthermore, the optical filter can be incorporated smoothly without giving any trouble to the movement of the diaphragm blades so that it maintains its own sliding function.

Therefore, the diaphragm device can be downsized even though the optical filter is integral to the diaphragm device insertably into and retractably from the optical path. Further, by forming the optical filter in a thin film, a difference in the length of the light path between the time when the optical filter is in the light path and the time when it is not can be made substantially zero. Therefore, a dummy filter for preventing light from being incorrectly focused is not necessary. As a result, it becomes possible to eliminate weight increase or space increase as much as possible when the optical filter is assembled, to improve easiness in assembling of the optical filter to the lens tube or the like, and also to contribute to reduction in size and weight of the lens tube and the like.

A second invention relates to the diaphragm device according to claim 1, wherein two sheets of the above-described diaphragm blades are provided in a layer, and the optical filter formed in a thin film as described above is disposed between those two sheets of the diaphragm blades.

In the diaphragm device of the present invention, since the optical filter is disposed in a gap between two sheets of the diaphragm blades, a special space for disposing the optical filter becomes unnecessary, which enables to downsize the diaphragm device. This became possible because the optical filter was formed in a thin film.

A third invention relates to the diaphragm device according to claim 1 or claim 2, wherein the optical filter is an infrared cutoff filter blocking light in the infrared region, and formed in a thin film of 0.25 mm or less in thickness.

Since the thin film having a thickness of 0.25 mm or less is used as an optical filter in the diaphragm device of the present invention, it is possible to make the difference in the length of light path resulted from existence and non-existence of the optical filter in the light path negligibly small. Therefore, it becomes unnecessary to consider prevention of light from being incorrectly focused in optical design, and a dummy filter becomes unnecessary, which makes it possible to realize downsizing. Further, since the dummy filter is not necessary and the optical filter itself is made thin and light weighted, a driving force of the filter driving device can be made small, resulting in downsizing of the filter driving device. Since the optical filter is an infrared cutoff filter which passes through visible light region and blocks light in the infrared (near-infrared) region, it is suitable for a diaphragm device to be used for a CCTV camera. When photographing at night, light in the infrared region are allowed to pass through to take photographs by retracting the optical filter from the light path, and when photographing in the daytime, light in the infrared region is blocked by inserting the optical filter in the light path, enabling to take photographs.

A fourth invention relates to the diaphragm device according to anyone of claim 1 to claim 3, wherein the optical filter is pivotably supported by a shaft provided at one end of the diaphragm board, and is inserted into and retracted from the light path by being pivoted around the shaft.

A system to slide the optical filter along the diaphragm blade may be a linear movement type or pivot type. However, the diaphragm device of the present invention adopts a pivot type in which the diaphragm device pivots around a shaft provided at the end portion of the diaphragm board, which enables the optical filter to pivotably slide directly without being fixed to a holder or the like, so that the driving system of the optical filter can be made of a space-saving type with a simple structure. Further, by adopting a pivot type (pivotably sliding type), it becomes possible to drive the optical filter without undue stress in a small gap between the diaphragm blades.

A fifth invention relates to the diaphragm device according to anyone of claim 1 to claim 4, wherein both the diaphragm driving device and filter driving device are disposed on the same side of the light path on the diaphragm board.

In the diaphragm device of the present invention, the diaphragm driving device and the filter driving device which are relatively large parts are provided on the same sides of the light path. That is, the parts (diaphragm driving device and filter driving device) having a relatively large dimensions in thickness direction of the diaphragm board are not disposed on both sides sandwiching the light path, but are disposed on one side of the diaphragm board together, which makes the opposite side thin. Therefore, when the diaphragm device is assembled to the lens tube, the diaphragm device can be assembled to the lens tube without undue stress and neither of the driving devices serves as a drag, while inserting the thin portion of the diaphragm device first into the lens tube from the side, thus enabling to assemble the diaphragm device to the lens tube or the like with ease.

A sixth invention relates to the diaphragm device according to any one of claim 1 to claim 5, wherein the filter driving device is provided with a filter holding device holding the optical filter at a first position magnetically when the optical filter is at the first position side rather than at a middle position of the first position in the light path and a second position departing from the light path, holding the optical filter at the second position magnetically when the optical filter is at the second position side rather than at the middle position.

In this diaphragm device, excepting when the optical filter is driven to insert into and retract from the light path, the optical filter can be held securely at either the first position or the second position by magnetic force. Therefore, at the time of transmitting the inserting and retracting movements of the optical filter to the optical filter, power supply to the filter driving device can be suspended so that the power consumption of the filter driving device can be reduced.

A seventh invention relates to the diaphragm device according to claim 6, wherein the filter holding device comprises: a permanent magnet provided on a rotor of the motor driving the optical filter, and a magnetic piece disposed at a position in equal distance from mutually adjacent north and south poles of the permanent magnet, when the optical filter is driven toward the middle of the path between the first and second positions, generating force of attraction between the magnetic piece and either the north pole or the south pole, thereby causing the rotor to pivot.

In this diaphragm device, when power supply to the motor which drives the optical filter is suspended, the optical filter is automatically positioned at either the first position or the second position by force of attraction generated between the permanent magnet and the magnetic piece according to the rotor position at the time. That is, when power supply to the motor is suspended in a state that the optical filter is moved to the first position side from the middle position, the optical filter is moved to the first position and securely held by magnetic power acting between the permanent magnet and the magnetic piece, and when power supply to the motor is suspended in a state that the optical filter is moved to the second position side from the middle position, the optical filter is moved to the second position and held by magnetic power acting between the permanent magnet and the magnetic piece. Since this state is maintained as it is due to suspension of the power supply to the motor, unnecessary power consumption of the motor can be cut so that the life of the battery can be prolonged.

An eighth invention relates to the diaphragm device according to any one of claim 1 to claim 7, wherein an ND filter different from the optical filter is provided in a transmitting hole forming a diaphragm aperture of the diaphragm blades, and the ND filter has spectroscopic transmittance characteristics in which the transmittance in the infrared region is substantially equal to that in the visible light region.

The diaphragm device of the present invention can reduce the transmission amount of the infrared light to the same transmission amount of light in the visible region by the ND filter when photographing at night using, for instance, a CCTV camera. Accordingly, the infrared light can be prevented from excessively exposed.

That is, assuming that the diaphragm device is installed on a CCTV camera, in this type of the conventional diaphragm device, the ND filter is generally affixed on the diaphragm blade at the position above the diaphragm aperture in order to widen a control range of the light amount on photographing in monochrome at night when no infrared cutoff filter is inserted. However, an ordinary ND filter is apt to take a state that the transmittance of the infrared light is increased, that is, a state that the infrared light passes through. Therefore, the infrared light at the time of photographing in monochrome can not be controlled uniformly in a similar manner to the visible light, the transmitting amount of infrared light becomes larger than that of the visible light, which makes a portion of a subject strongly lighted by the infrared light bright so that the photographed image is hard to see. As for this point, the diaphragm device of the eighth invention realizes reduction of transmission amount of the infrared light to the same degree as light amount in the visible light region by ND filter. Accordingly, a portion of a subject strongly lighted by infrared light does not become too bright, so that a photographed image being easy to see can be obtained.

1. DIAPHRAGM DEVICE
2. LENS TUBE
10. DIAPHRAGM BOARD
12, 13 DIAPHRAGM BLADES
12f, 13f ND FILTERS
15. OPTICAL FILTER
20. DIAPHRAGM DRIVING DEVICE (DIAPHRAGM DRIVING SYSTEM)
30. FILTER DRIVING DEVICE (FILTER DRIVING SYSTEM)
32. ROTOR (PERMANENT MAGNET)
36. COIL (STATOR)
37. SOFT MAGNETIC MATERIAL

BEST MODE FOR CARRYING OUT THE INVENTION

Hereinafter, an embodiment of the present invention will be explained based on drawings.

Figure 1:
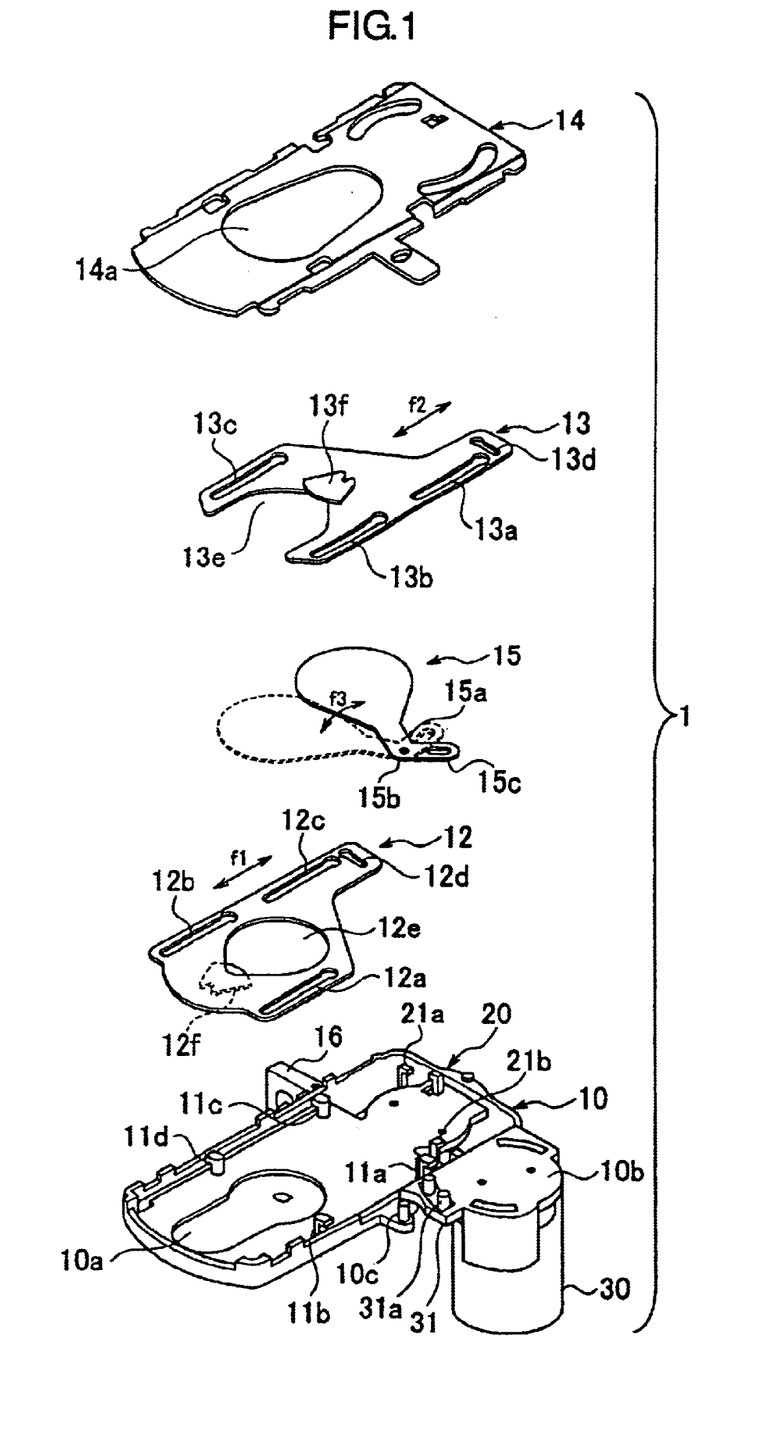
FIG. 1 is an exploded perspective view of a diaphragm device of an embodiment of the present invention.

FIG. 1 is an exploded perspective view of a diaphragm device 1 of the present embodiment.

The diaphragm device 1 comprises a rectangle flat diaphragm board 10 made of a plastic mold product, a pair of diaphragm blades 12 and 13 assembled slidably on a top face (on one of the board surfaces) of the diaphragm board 10 in a state of putting on top of each other, a thin film optical filter 15 disposed slidably while rotating between these two sheets of the diaphragm blades 12 and 13, a blade cover 14 put on the diaphragm board 10 to cover the diaphragm blades 12 and 13 after assembling the diaphragm blades 12, 13 and the optical filter 15 on the top face of the diaphragm board 10, and a diaphragm driving device 20 and a filter driving device 30 assembled on a bottom face of the diaphragm board 10.

Apertures 10a and 14a are formed to form a light path (a passage of light in which an optical axis is indicated by a longitudinal central axis line in the drawing) on the diaphragm board 10 and the blade cover 14, and notch shaped or hole shaped transmitting holes 12e and 13e to form a diaphragm aperture are provided on the diaphragm blades 12 and 13. By linearly sliding the diaphragm blades 12 and 13 in the arrow directions f1 and f2 on the diaphragm board 10, the aforementioned light path can be adjusted with the diaphragm device. The diaphragm driving device 20 allows the diaphragm blades 12 and 13 to slide via driving pins 21a and 21b provided on a drive lever (not shown) and is structured with a motor as a main element thereof.

The optical filter 15 has transmission characteristics in accordance with a wave length, and an infrared cutoff filter to block light in the infrared light region (including the near-infrared light region) is used here. The filter driving device 30 serves to insert the optical filter 15 into and retract from the light path by allowing the optical filter 15 to pivotably slide via a driving lever 31 and is structured with a motor as a main element thereof.

The optical filter 15 is inserted into a narrow gap between two diaphragm blades 12 and 13 by being formed in a thin film having a thickness of 0.25 mm or less. and is provided so as to be able to slide along the diaphragm blades 12 and 13. Thus, by being sandwiched between two sheets of the diaphragm blades 12 and 13, the optical filter 15 can slide smoothly using the surfaces of the diaphragm blades 12 and 13 as a guide face, which makes it possible to realize a stable inserting and retracting movement although the filter is thin.

Meanwhile, ND filters 12f and 13f which are different from the optical filter 15 consisting of an infrared cutoff filter, are fixed on the transmitting hole 12e and 13e to form a diaphragm aperture of the diaphragm blades 12 and 13. These ND filters 12f and 13f are prepared to have spectroscopic transmittance characteristics such that the transmittance of light in the infrared region is substantially equal to the transmittance of light in the visible region.

In proximity to a peripheral portion of the diaphragm board 10, a plurality of tip hook attached guide pins 11a, 11b, 11c and 11d which engage with the diaphragm blades 12 and 13, are provided on the top face of the diaphragm board 10. Further, long grooves 12a, 12b, 12c, 13a, 13b, and 13c are provided close to side edge portions of the diaphragm blades 12 and 13 in parallel to respective side edge portions. Then, the diaphragm blades 12 and 13 are held linearly slidable on the top face of the diaphragm board 10 in the arrow directions f1 and f2 by fixing these long grooves 12a, 12b, 12c, 13a, 13b and 13c into the guide pins 11a, 11b, 11c, and 11d. Incidentally, the tip hook portions of the guide pins 11a, 11b, 11c, and 11d serve to prevent the diaphragm blades 12 and 13 from coming off upwards. Note that what is shown by the numeral 16 provided on the diaphragm board 10 in FIG. 1 is a fixing bracket to fix the diaphragm device 1 into the lens tube or the like (the explanation will be made later using FIG. 3).

As elements to drive the diaphragm blades 12 and 13, first, lateral grooves 12d and 13d orthogonal to the sliding direction of respective diaphragm blades 12 and 13 are provided on the end portions in the longitudinal directions of respective diaphragm blades 12 and 13. Meanwhile, a driving lever (not shown) is provided on the diaphragm driving device 20 fixed on the bottom face of the diaphragm board 10. The driving lever is provided with the driving pins 21a and 21b projecting into the top face of the diaphragm board 10 at both end of the lever, and the center portion is bonded to a motor shaft (not shown) of the diaphragm driving device 20. The lateral grooves 12d and 13d provided on the end portions in the longitudinal direction of respective diaphragm blades 12 and 13 are engaged into respective driving pins 21a and 21b, and when the motor of the diaphragm driving device 20 is pivotably driven using the above-described mechanism, two sheets of the diaphragm blades 12 and 13 slide linearly due to pivot of the driving pins 21a and 21b so that adjustment of the aperture of the diaphragm for the light path can be achieved.

As described above, the optical filter 15 disposed between two sheets of the diaphragm blades 12 and 13 which slide linearly is an integral-type mold product in which a portion to block the light path is formed into substantially a round shape slightly larger than the transmitting holes 12e and 13e of the diaphragm blades 12 and 13, and has a crank lever 15a extending outwards at one end. A transmitting hole 15b is provided on a bending portion of the crank lever 15a, and a long hole 15c is provided at a tip end side of the crank lever 15a.

A bracket 10b to fix the filter driving device 30 is projectingly provided in one piece at one side edge portion of the diaphragm board 10, and a motor (without a numeral, in particular) which is a main element of the filter driving device 30 is fixed on the bottom face of the bracket 10b. A spindle 10c to support the optical filter 15 is projectingly provided close to the bracket 10a, and a driving pin 31a provided at the tip of the driving lever 31 of the filter driving device 30 is projected close to the spindle 10c.

The optical filter 15 is supported pivotably along the plane of the diaphragm blades 12 and 13 around the spindle 10c by fitting the transmitting hole 15b provided on the bending portion of the crank lever 15a into the spindle 10c. The driving pin 31a of the filter driving device 30 is engaged into the long hole 15c provided on the tip end side of the crank lever 15a, and thus, by driving the filter driving device 30, the optical filter 15 pivots around the spindle 10c due to pivoting of the driving pin 31a, so that the optical filter 15 is inserted into the light path and retracted from the light path (the optical filter 15 is inserted into and retracted from the light path).

In this case, both of the diaphragm driving device 20 and the filter driving device 30 are disposed on the same side of the light path on the diaphragm board 10. That is, the diaphragm driving device 20 and the filter driving device 30 are disposed together on one end side in the longitudinal direction of the diaphragm board 10. Therefore, the other end side of the diaphragm board where no driving devices 20 and 30 are provided is kept in a thin board dimensionally.

Next, the structure of the filter driving device 30 driving the optical filter 15 to insert into and retract from the light path will be explained in detail.

The filter driving device 30 is provided with a filter holding function (filter holding device) which performs positioning and holding of the optical filter 15 at either the first position (operating position of the filter) on the light path, or the second position (no-operating position of the filter) away from the light path even when power supply to the motor is suspended.

The filter holding function is a function to eventually hold the optical filter 15 at the first position by biasing the optical filter 15 to the first position side by magnetic force when the optical filter 15 is at the first position side rather than the middle position of the first position in the light path (operating position of the filter) and the second position away from the light path (no-operating position of the filter), and to eventually hold the optical filter 15 at the second position by biasing the optical filter 15 to the second position side by magnetic force when the optical filter 15 is at the second position side rather than the aforementioned middle position.

In this embodiment, a function to hold the optical filter 15 at either the first position or second position (filter holding function=filter holding device) is achieved (structured) with a permanent magnet provided in a rotor of a motor driving the optical filter 15, and a magnetic piece which generates force of attraction between the north pole or the south pole of the permanent magnet, thereby giving pivotably biasing force to the rotor.

Figure 2:
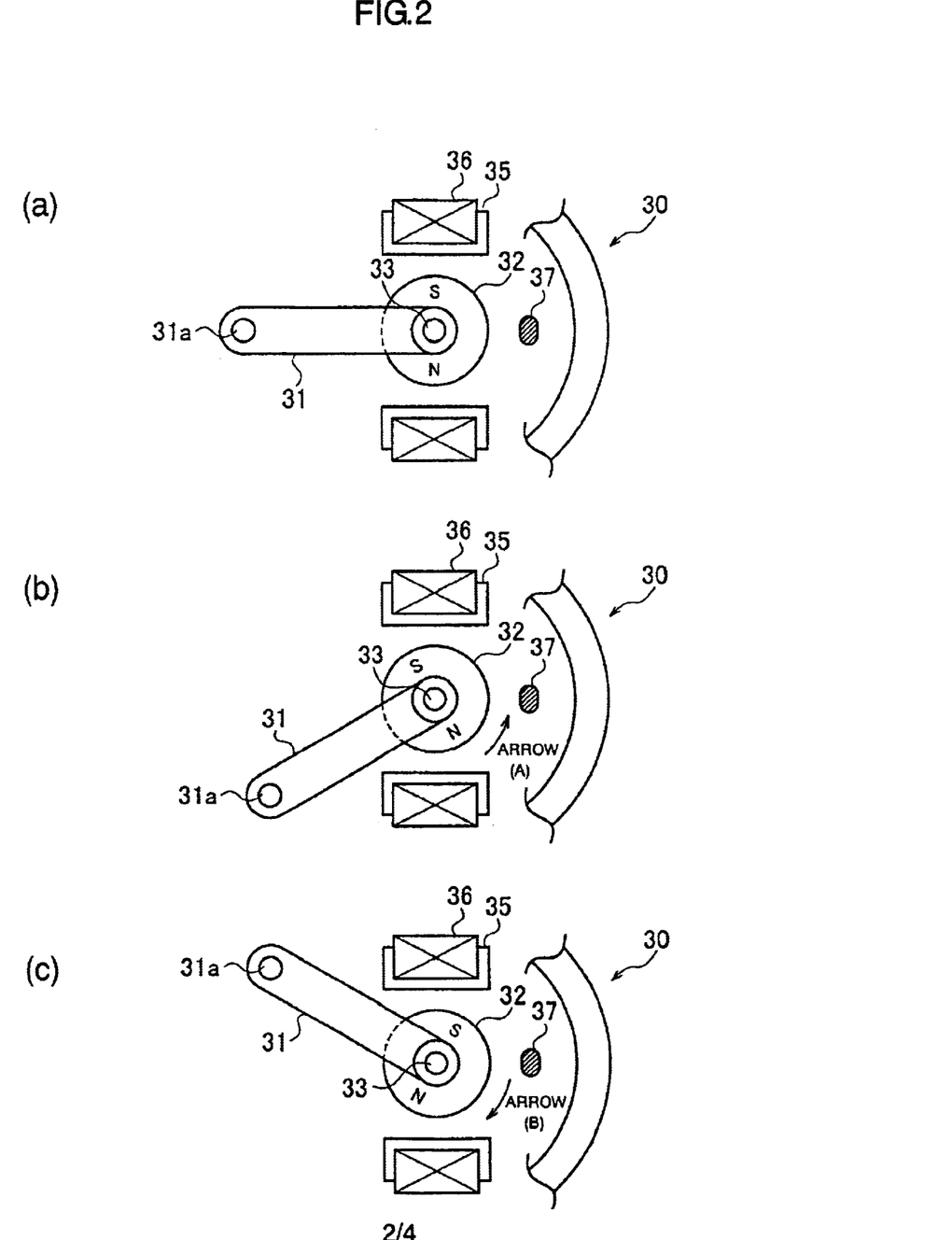
FIG. 2 is a view showing a structure of a filter driving device of the diaphragm device, in which (a) is a view showing a state that the optical filter is at the middle position of the first position (position in the light path) and the second position (position away from the light path), (b) is a view showing a state that the optical filter is at the second position (position away from the light path), and (c) is a view showing a state that the optical filter is at the first position (position in the light path)

This point will be explained in detail referring to FIG. 2.

A motor which is a main element of the filter driving device 30 is, as shown in FIG. 2A, comprises a rotor 32 having a rotor shaft 33, a coil bobbin 35 disposed around the rotor 32 to pivotably drive the rotor 32, a coil 36 wound around the coil bobbin 35, a cylindrical yoke 30 fitting the coil bobbin 35, and so on. Here, a stator is structured with the yoke, the coil bobbin 35, and the coil 36.

The rotor 32 is structured with a cylindrical permanent magnet in which both ends in a diametrical direction are polarized into the north pole and the south pole. The rotor shaft 33 is made of resin, and is connected to a proximal end portion of the driving lever 31 engaging to the optical filter 15 at the tip end portion projecting outwards. Further, a soft magnetic piece 37 is disposed between the inside of the stator yoke 30 and the rotor 32. The soft magnetic piece 37 is disposed at the position having substantially an equal distance from the north pole and the south pole of the rotor 32, when the driving lever 31 is operated so that the optical filter 15 comes to the middle position of the first position and the second position, as shown in FIG. 2(a). There, a force of attraction is generated between the north pole or the south pole of the rotor 32 and the soft magnetic piece 37, thereby serving a function to give pivotably biasing force to the rotor 32.

FIG. 2(b) shows a pivoting position of the rotor 32 when the optical filter 15 reaches the second position (away from the light path) as a result that the rotor 32 swings in the arrow (A) direction. At this time, since the north pole of the rotor 32 comes close to the soft magnetic material 37, a big magnetic force of attraction is generated between the north pole and the soft magnetic material 37, so that the rotor 32, namely the optical filter 15, is kept at the second position by the magnetic force of attraction even when power supply to the motor is suspended.

FIG. 2(c) shows a pivoting position of the rotor 32 when the optical filter 15 reaches the first position (in the light path) as a result that the rotor 32 swings in the arrow (B) direction. At this time, since the south pole of the rotor 32 comes close to the soft magnetic material 37, a big magnetic force of attraction is generated between the south pole and the soft magnetic material 37, so that the rotor 32, namely the optical filter 15, is kept at the first position by the magnetic force of attraction even when power supply to the motor is suspended.

Accordingly, the optical filter 15 can be thus held by magnetic force of a permanent magnet at either position of the first position or at the second position, and since power supply to the motor becomes unnecessary in such a state, heat generation due to power supply can be eliminated, and the life of the battery power source can be prolonged. In particular, in the diaphragm device 1 of the present embodiment, since magnetic force (namely, biasing force) to be used for positioning of the optical filter 15 can be obtained by utilizing the permanent magnet of the rotor, the filter driving device can be prepared with a simple structure of only disposing the soft magnetic piece 37 at a predetermined position.

Next, assuming the case of applying the diaphragm device 1 to a day and night monitoring CCTV camera, its function will be explained.

In this diaphragm device 1, the driving pins 21a and 21b engaging with the diaphragm blades 12 and 13 are pivoted by drive-controlling the diaphragm driving device 20, and the diaphragm blades 12 and 13 are allowed to slide linearly by the pivoting so that adjustment of the aperture of the diaphragm for the light path can be performed. At a position near the maximum diaphragm, since ND filters 12f and 13f fixed to the transmitting holes 12e and 13e in the diaphragm blades 12 and 13 are positioned in the light path, the function of ND filter influences photographing light.

Meanwhile, in this diaphragm device 1, since the driving lever 31 pivots owing to driving of the filter driving device 30, the optical filter 15 can be pivotably slid around the spindle 10c by the pivoting to be inserted into and retracted from the light path.

Since the optical filter 15 in this case is an infrared cutoff filter, light in the infrared region can be cut from photographing light by positioning the optical filter 15 in the light path. In addition, since transmission amount of the infrared light at the time of photographing at night can be reduced to the same degree as light amount in the visible light region by ND filters 12f and 13f, the infrared light can be prevented from being excessively photographed. Accordingly, a portion of a subject strongly lighted by infrared light does not become too bright, so that a photographed image easy to see can be obtained.

In the present diaphragm device 1 which enables to obtain such a function, since the optical filter 15 is formed in a thin film, disposed on one board face (top face) side of the diaphragm board 10 together with the diaphragm blades 12 and 13, and provided slidably along the diaphragm blades 12 and 13, the structure of the diaphragm device 1 can be simplified.

Especially, since the optical filter 15 is disposed in a small gap between two sheets of diaphragm blades 12 and 13, an excessive space for the optical filter 15 becomes completely unnecessary, so that downsizing of the diaphragm device 1 in thickness direction can be realized. Further, since the optical filter 15 can be slid using two sheets of the diaphragm blades 12 and 13 as a guide, smoothness of movement of the optical filter 15 can be realized.

In addition, by forming the optical filter 15 in a thin film of 0.25 mm or less in thickness, it becomes possible to make difference in the length of light path resulted from existence and non-existence of the optical filter 15 negligible small, and optical design considering prevention of light from being incorrectly focused can be made unnecessary. In other words, a dummy filter is unnecessary so that reduction in size and weight of the diaphragm device including its driving system can be achieved.

Therefore, downsizing of the whole of the diaphragm device 1 (especially, making the diaphragm device to be thin) can be realized while integrating the optical filter 15 insertable into and retractable from the light path in a piece, which makes it easy to be incorporated with the lens tube or the like and attributes to reduction in weight and size of the lens tube and the like.

Since a slide system of the optical filter 15 is not made of a linearly sliding type as is adopted in the diaphragm blades 12 and 13, but adopts a pivot type, the driving system of the optical filter 15 can be of a space-saving simple structure so that design of the diaphragm device can be performed without undue stress on locating of the diaphragm device together with the driving system of the diaphragm blades 12 and 13.

In particular, in the present diaphragm device 1, since the diaphragm driving device 20 and the filter driving device 30 are provided on the same side of the light path, when the diaphragm device 1 is assembled to, for instance, a lens tube of a CCTV camera, the diaphragm device 1 can be assembled without undue stress to the lens tube while either the diaphragm device 20 or the filter diaphragm device 30 does not disturb the assembling.

Figure 3:
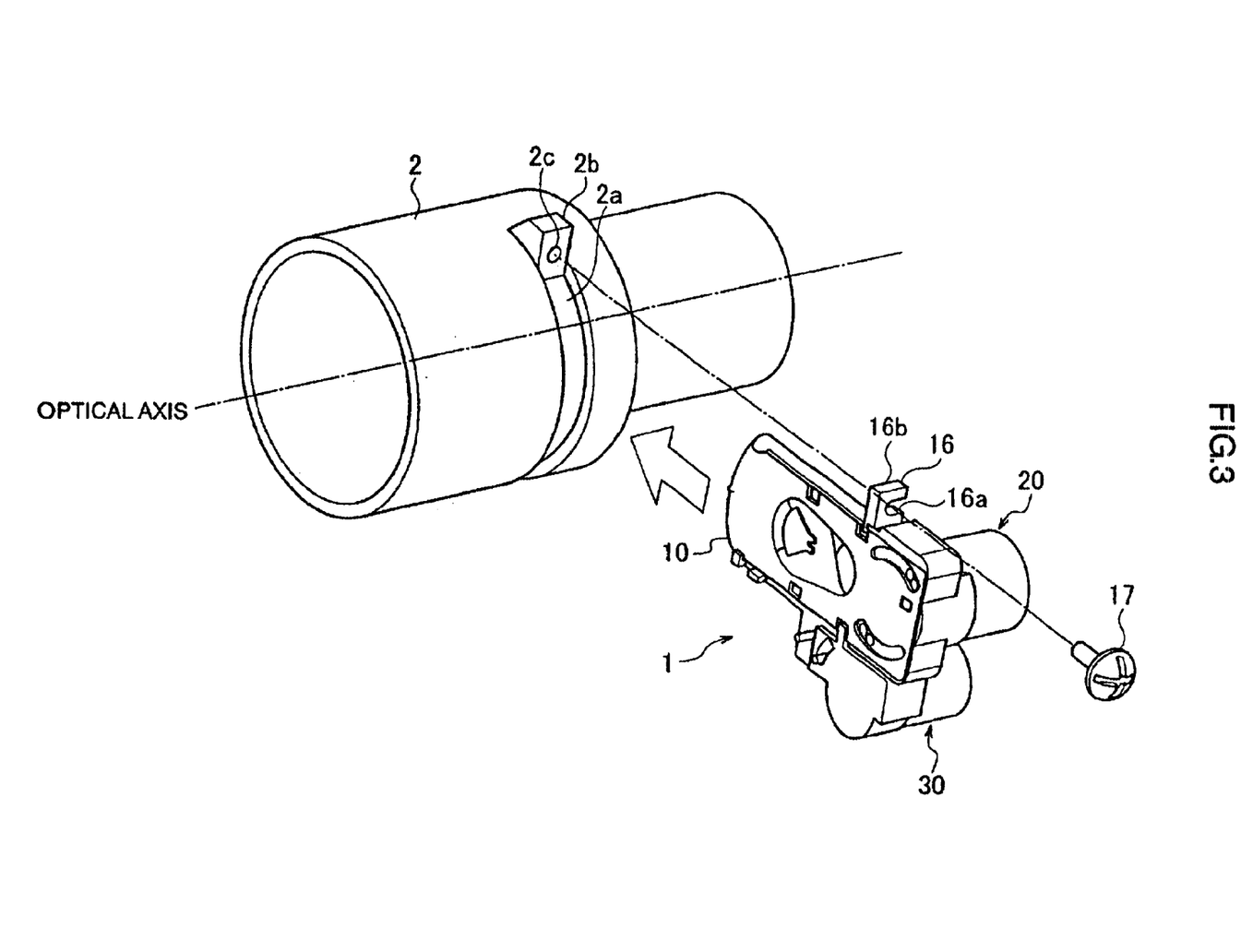
FIG. 3 is a perspective view used to explain the way of assembling the diaphragm device into a lens tube from the side;.

FIG. 3 shows an example of fixing of the diaphragm device 1 to the lens tube 2.

A side hole 2a is provided on a peripheral wall of the lens tube 2, so that the diaphragm device 1 can be inserted into the side hole 2a from the direction orthogonal to the optical axis. A fixing seat 2b is provided on one end of the side hole 2a, and a screw hole 2c is provided in the front face of the fixing seat 2b. Meanwhile, a fixing bracket 16 to be used for fixing is provided on the diaphragm board 10 of the diaphragm device 1, and a notch 16a for a screw to pass through and an abutting face 16b against the fixing seat 2b on the lens tube 2 side are provided on the fixing bracket 16.

Since the diaphragm device 1 has both of the diaphragm driving device 20 and the filter diving device 30 disposed on one side of the light path together, the opposite side to the side having the driving devices 20 and 30 is kept to be a thin board. Accordingly, when the diaphragm device 1 is assembled to the lens tube 2, a thinner side of the diaphragm device 1 is inserted into the side hole 2a of the lens tube 2, and the abutting face 16b of the fixing bracket 16 is abutted on the front face of the fixing seat 2a on the lens tube 2 side. Then, the screw 17 is tightened into the screw hole 2b of the fixing seat 2a through the notch 16a of the fixing bracket 16 in such a state, which enables to fix the diaphragm device 1 into the lens tube 2. Accordingly, fixing to the lens tube 2 can be achieved simply with a favorable workability.

It should be noted that in the above-described embodiment, the blade cover 14 is fixed on the top face of the diaphragm board 10 to prevent the diaphragm blades 12 and 13 and the like from falling away. However, since the diaphragm blades 12 and 13 are held to stop falling away by the guide pins 11a to 11d on the diaphragm board 10 side it is not necessarily required to fix the blade cover 14.

The case of adjusting diaphragm with two sheets of the diaphragm blades 12 and 13 has been explained in the above-described embodiment. However, the present invention can be applied to the case when diaphragm is adjusted with one sheet of the diaphragm blade. In this latter case, for instance. it can be achieved by disposing the optical filter 15 in a gap between one sheet of the diaphragm blades and the diaphragm board.

Industrial Availability

As explained above, the following effects can be obtained according to the present invention.

That is, according to the first invention, since the optical filter is formed in a thin film, disposed together with the diaphragm blades on one surface side of the diaphragm board, and provided slidably along the diaphragm blades, the structure of the diaphragm device can be simplified. Further, the optical-filter can be disposed in a narrow space such as a gap between the diaphragm blades, a gap between the diaphragm blades and the diaphragm board, or the like, without giving any trouble to the movement of the diaphragm blade or its own movement. Therefore, the diaphragm device can be downsized (especially, making the diaphragm device thin) even though the optical filter is integrally assembled insertably into and retractably from the optical path. Further, by forming the optical filter in a thin film, the dummy filter for preventing light from being incorrectly focused becomes unnecessary to be provided. As a result, it becomes possible to eliminate weight increase or space increase, to improve in assembling of the optical filter to the lens tube or the like so as to contribute to reduction in size and weight of the lens tube and the like.

According to the second invention, since the optical filter is disposed in a gap between two sheets of the diaphragm blades, a special space for disposing the optical filter becomes unnecessary, which enables to downsize the diaphragm device. Further, since the optical filter can be slid using two sheets of the diaphragm blades as a guide, smoothness of movement of the optical filter can be realized.

According to the third invention, since the thickness of the optical filter is made to be 0.25 mm or less, it becomes possible to make the difference in the length of light path resulted from existence and non-existence of the optical filter negligibly small, and it becomes unnecessary to consider prevention of light from being incorrectly focused in optical design. In other words, a dummy filter becomes unnecessary, and reduction in size and weight including its driving system can be achieved. Besides, since the optical filter is an infrared cutoff filter, it is suitable for a diaphragm device of a day and night CCTV camera.

According to the fourth invention, since a pivot type is adopted for a slide system of the optical filter, the driving system of the optical filter can be made of a space-saving type simple structure. Further, by adopting a pivot type, it becomes possible to drive the optical filter without undue stress in a small gap between the diaphragm blades.

According to the fifth invention, since the diaphragm driving device and the filter driving device are provided on the same side of the light path, when the diaphragm device is assembled to the lens tube, the diaphragm device can be assembled to the lens tube without undue stress, and neither of the driving devices serves as a drag, thus enabling to assemble the diaphragm device to the lens tube or the like with ease.

According to the sixth invention, since the optical filter is held at either the first position or the second position by magnetic force, power consumption of the filter driving device can be reduced.

According to the seventh invention, since the magnetic force is obtained by utilizing the permanent magnet of the rotor in the motor constituting the filter driving device, a useless structure can be eliminated as much as possible to constitute the diaphragm device in low cost.

According to the eighth invention, since the diaphragm device can reduce the transmission amount of the infrared light to the same degree as the amount of light in the visible region by the ND filter when photographing at night using, for instance, a CCTV camera, the infrared light can be prevented from being excessively photographed. Accordingly, a portion of a subject strongly lighted by infrared light does not become too bright, so that a photographed image being easy to see can be obtained.

What is claimed is:

1. A diaphragm device, comprising:
   a diaphragm board having an aperture forming a light path;
   at least one diaphragm blade disposed on one face of the diaphragm board, and adjusting the aperture of the diaphragm for the light path by sliding along the board face;
   a diaphragm driving device driving the at least one diaphragm blade to adjust the aperture of the diaphragm for the light path;

an optical filter having transmission characteristics in accordance with a wave length; and a filter driving device to insert the optical filter into and retract it from the light path, wherein said optical filter is formed in a thin film, disposed on one face side of said at least one diaphragm blade and provided slidably along said diaphragm blades.

2. The diaphragm device according to claim 1, wherein said at least one diaphragm blade includes a first diaphragm blade and a second diaphragm blade, and wherein said first and second diaphragm blades are sheets provided in a stacked state, and the optical filter formed in said thin film is disposed between said first and second diaphragm blades.

3. The diaphragm device according to claim 1, wherein said optical filter is an infrared cutoff filter blocking light in the infrared region, and formed in a thin film of 0.25 mm or less in thickness.

4. The diaphragm device according to claim 1, wherein said optical filter is pivotably supported by a shaft provided at one end portion of the diaphragm board, and is inserted into and retracted from the light path by being pivoted around the shaft.

5. The diaphragm device according to claim 1, wherein both said diaphragm driving device and filter driving device are disposed on the same side of said light path on said diaphragm board.

6. The diaphragm device according to claim 1, wherein said filter driving device is provided with a filter holding device holding the optical filter at a first position magnetically when said optical filter is at the first position side rather than at a middle position of the first position in the light path and a second position departing from the light path, holding the optical filter at the second position magnetically when the optical filter is at the second position side rather than at said middle position.

7. The diaphragm device according to claim 6, wherein said filter holding device comprises:

a permanent magnet provided on a rotor of the motor driving said optical filter; and a magnetic piece disposed at a position in equal distance from mutually adjacent north and south poles of said permanent magnet, when said optical filter is driven toward the middle of the path between said first and second positions, generating force of attraction between the magnetic piece and either said north pole or said south pole, thereby causing the rotor to pivot.

8. The diaphragm device according to claim 1, wherein an ND filter being different from said optical filter is provided in a transmitting hole forming a diaphragm aperture of said at least one diaphragm blade, and this ND filter includes spectroscopic transmittance characteristics in which the transmittance in the infrared region is substantially equal to that in the visible light region.

9. The diaphragm device according to claim 2, wherein said optical filter is an infrared cutoff filter blocking light in the infrared region, and formed in a thin film of 0.25 mm or less in thickness.

10. The diaphragm device according to claim 2, said optical filter is pivotably supported by a shaft provided at one end portion of the diaphragm board, and is inserted into and retracted from the light path by being pivoted around the shaft.

11. The diaphragm device according to claim 3, wherein said optical filter is pivotably supported by a shaft provided at one end portion of the diaphragm board, and is inserted into and retracted from the light path by being pivoted around the shaft.

12. The diaphragm device according to claim 2, wherein both said diaphragm driving device and filter driving device are disposed on the same side of said light path on said diaphragm board.

13. The diaphragm device according to claim 3, wherein both said diaphragm driving device and filter driving device are disposed on the same side of said light path on said diaphragm board.

14. The diaphragm device according claim 4, wherein both said diaphragm driving device and filter driving device are disposed on the same side of said light path on said diaphragm board.

15. The diaphragm device according to claim 2, wherein said filter driving device is provided with a filter holding device holding the optical filter at a first position magnetically when said optical filter is at the first position side rather than at a middle position of the first position in the light path and a second position departing from the light path, holding the optical filter at the second position magnetically when the optical filter is at the second position side rather than at said middle position.

16. The diaphragm device according to claim 3, wherein said filter driving device is provided with a filter holding device holding the optical filter at a first position magnetically when said optical filter is at the first position side rather than at a middle position of the first position in the light path and a second position departing from the light path, holding the optical filter at the second position magnetically when the optical filter is at the second position side rather than at said middle position.

17. The diaphragm device according to claim 4, wherein said filter driving device is provided with a filter holding device holding the optical filter at a first position magnetically when said optical filter is at the first position side rather than at a middle position of the first position in the light path and a second position departing from the light path, holding the optical filter at the second position magnetically when the optical filter is at the second position side rather than at said middle position.

18. The diaphragm device according to claim 5, wherein said filter driving device is provided with a filter holding device holding the optical filter at a first position magnetically when said optical filter is at the first position side rather than at a middle position of the first position in the light path and a second position departing from the light path, holding the optical filter at the second position magnetically when the optical filter is at the second position side rather than at said middle position.

19. The diaphragm device according to claim 2, wherein an ND filter being different from said optical filter is provided in a transmitting hole forming a diaphragm aperture of said at least one diaphragm blade, and this ND filter includes spectroscopic transmittance characteristics in which the transmittance in the infrared region is substantially equal to that in the visible light region.

20. The diaphragm device according to claim 3, wherein an ND filter being different from said optical filter is provided in a transmitting hole forming a diaphragm aperture of said at least one diaphragm blade, and this ND filter includes spectroscopic transmittance characteristics in which the transmittance in the infrared region is substantially equal to that in the visible light region.

* * * * *

UNITED STATES PATENT AND TRADEMARK OFFICE
CERTIFICATE OF CORRECTION

PATENT NO. : 6,817,788 B1
DATED : January 13, 2005
INVENTOR(S) : Shigeto Negishi et al.

It is certified that error appears in the above-identified patent and that said Letters Patent is hereby corrected as shown below:

Column 13,
Line 6, delete "at least one";
Line 7, change "blade" to -- board --;
Line 7, after the phrase "along said" insert the words -- at least one --; and
Line 8, change "blades" to -- blade --.

Signed and Sealed this

Nineteenth Day of April, 2005

JON W. DUDAS
*Director of the United States Patent and Trademark Office*